US008447368B2

(12) United States Patent
Zettler et al.

(10) Patent No.: US 8,447,368 B2
(45) Date of Patent: May 21, 2013

(54) BASE STATION, METHOD OF OPERATING A BASE STATION AND WIRELESS COMMUNICATION SYSTEM

(75) Inventors: Thomas Zettler, Hoehenkirchen (DE); Charles Bry, Unterhaching (DE); Pidder Kassel, Oberhaching (DE); Elias Bjarnason, Grasbrunn (DE)

(73) Assignee: Lantiq Deutschland GmbH, Neubiberg (DE)

( * ) Notice: Subject to any disclaimer, the term of this patent is extended or adjusted under 35 U.S.C. 154(b) by 1007 days.

(21) Appl. No.: 12/270,644

(22) Filed: Nov. 13, 2008

(65) Prior Publication Data

US 2010/0120476 A1 May 13, 2010

(51) Int. Cl.
H04B 1/38 (2006.01)

(52) U.S. Cl.
USPC ..... 455/574; 455/572; 455/343.1; 455/343.2; 455/343.5; 455/522; 455/127.1; 370/311; 370/347; 375/316

(58) Field of Classification Search
USPC ................ 455/574, 572, 343.1, 343.2, 343.5, 455/522, 127.1; 370/311, 347; 375/316
See application file for complete search history.

(56) References Cited

U.S. PATENT DOCUMENTS

| | | | | |
|---|---|---|---|---|
| 6,463,050 | B1* | 10/2002 | Nagashima | 370/347 |
| 6,487,410 | B1* | 11/2002 | Kontio et al. | 455/437 |
| 6,584,330 | B1* | 6/2003 | Ruuska | 455/574 |
| 6,754,513 | B1* | 6/2004 | Ilg | 455/574 |
| 7,069,455 | B2 | 6/2006 | Muljono et al. | |
| 7,190,972 | B1 | 3/2007 | Hollister et al. | |
| 7,266,389 | B2* | 9/2007 | Karaoguz et al. | 455/556.1 |
| 7,277,737 | B1* | 10/2007 | Vollmer et al. | 455/574 |
| 7,436,905 | B2* | 10/2008 | Shirakawa et al. | 375/316 |
| 7,590,396 | B2 | 9/2009 | Behzad et al. | |
| 7,590,432 | B2 | 9/2009 | Behzad et al. | |
| 7,668,129 | B2* | 2/2010 | Alon et al. | 370/311 |
| 7,751,357 | B2* | 7/2010 | Muqattash et al. | 370/311 |
| 7,873,380 | B2* | 1/2011 | Miyazaki et al. | 455/522 |
| 8,055,313 | B2 | 11/2011 | Behzad et al. | |
| 8,103,229 | B2 | 1/2012 | Behzad et al. | |
| 2004/0199697 | A1* | 10/2004 | Meynard | 710/303 |
| 2005/0227734 | A1* | 10/2005 | Euscher | 455/561 |
| 2006/0019695 | A1* | 1/2006 | Miyazaki et al. | 455/522 |
| 2006/0161778 | A1 | 7/2006 | Stirbu et al. | |
| 2007/0082647 | A1 | 4/2007 | Behzad et al. | |
| 2007/0142098 | A1 | 6/2007 | Behzad et al. | |
| 2007/0238438 | A1 | 10/2007 | Alon et al. | |
| 2008/0002600 | A1 | 1/2008 | Choi | |
| 2010/0003935 | A1 | 1/2010 | Behzad et al. | |
| 2010/0003936 | A1 | 1/2010 | Behzad et al. | |
| 2010/0019887 | A1* | 1/2010 | Bridgelall et al. | 340/10.2 |
| 2012/0122518 | A1 | 5/2012 | Behzad et al. | |

FOREIGN PATENT DOCUMENTS

| | | |
|---|---|---|
| CN | 1817015 A | 8/2006 |
| CN | 1984169 A | 6/2007 |

(Continued)

*Primary Examiner* — April G Gonzales
(74) *Attorney, Agent, or Firm* — Murphy, Bilak & Homiller, PLLC

(57) ABSTRACT

A base station for wireless communication comprises a receiver and a processor. The receiver has a first operating state and a second operating state with different power consumption levels. In the first operating state, the receiver is configured to receive a signal. The processor is coupled to the receiver to switch the receiver between the first and second operating states.

28 Claims, 10 Drawing Sheets

FOREIGN PATENT DOCUMENTS

| | | |
|---|---|---|
| DE | 10240137 A1 | 3/2004 |
| EP | 1684467 B1 | 5/2007 |
| WO | 2004/075437 A1 | 9/2004 |
| WO | 2004075583 A1 | 9/2004 |
| WO | 2005120101 A1 | 12/2005 |
| WO | 2007/131097 A1 | 11/2007 |

* cited by examiner

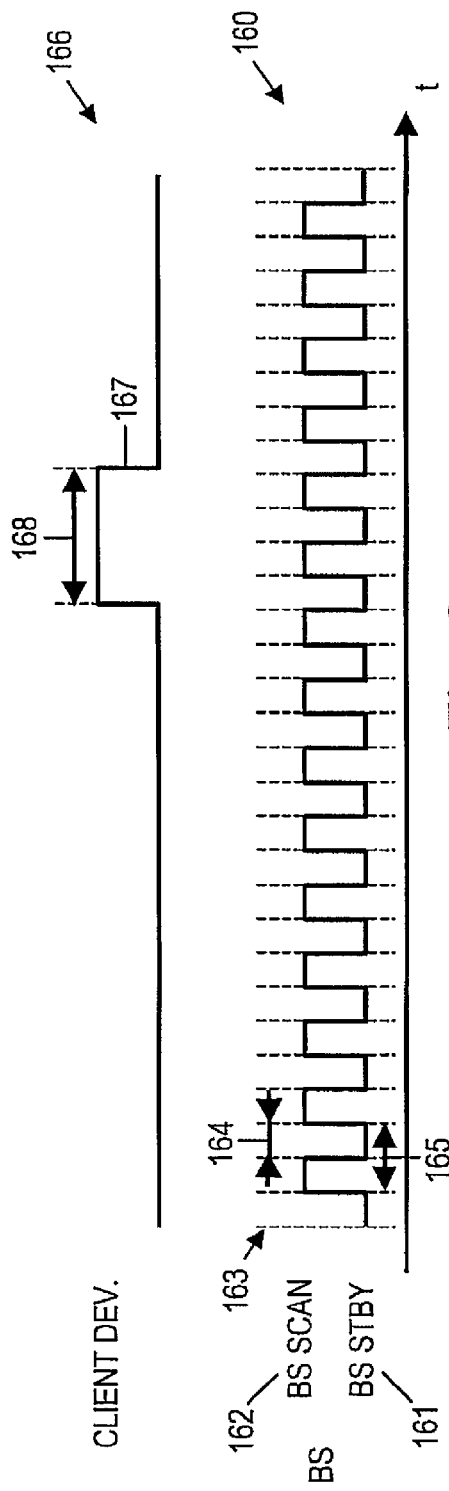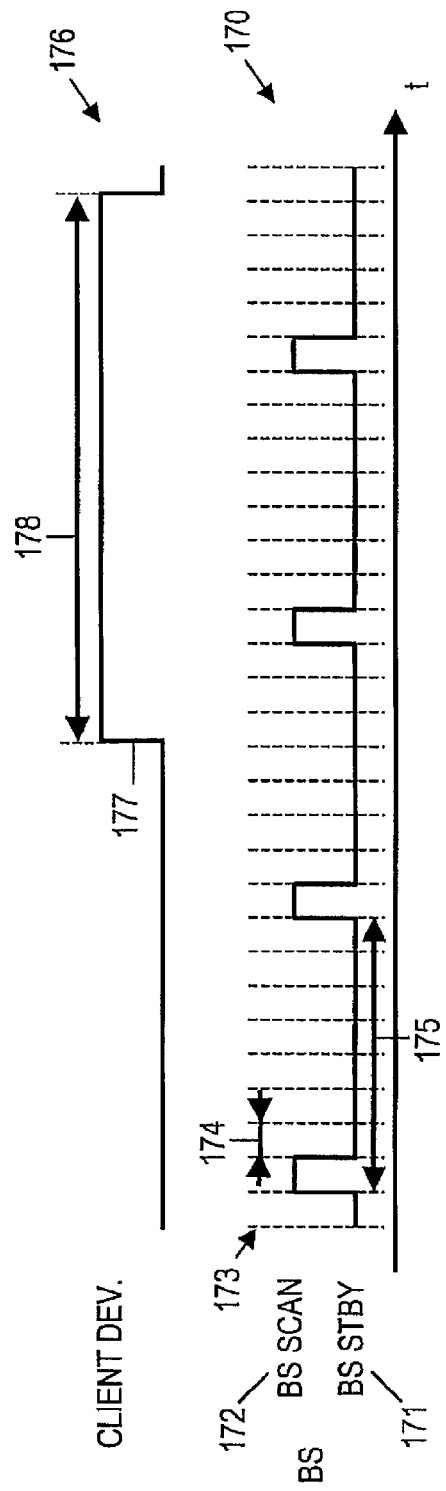

BASE STATION, METHOD OF OPERATING A BASE STATION AND WIRELESS COMMUNICATION SYSTEM

BACKGROUND OF THE INVENTION

The present invention relates to methods and devices for use in wireless communication. In particular, the present invention relates to a base station for wireless communication, a wireless communication system and a method of operating a base station.

In various wireless communication systems a base station is provided that is configured to allow plural client devices associated with the base station to communicate with each other or to allow a client device associated with the base station to communicate with a network via the base station.

A client device may transmit a request to the base station in order to request that a connection be established with the base station. In order to allow the client device to establish a connection with the base station, the base station should be operative to process the request transmitted by the client device.

SUMMARY

According to an embodiment, a base station for wireless communication is provided. The base station may comprise a receiver and a processor coupled to the receiver. The receiver may have a first operating state in which the receiver is configured to receive signals and a second operating state. Power consumption levels of the receiver in the second operating state and in the first operating state may be different. The processor may be configured to control the receiver based on at least one parameter so that the receiver repeatedly switches between the first operating state and the second operating state.

According to an embodiment, a wireless communication system is provided. The wireless communication system comprises a base station and a client device. The base station may comprise a receiver. The client device may be configured to transmit a request signal to the base station to request a connection to be established with the base station. The base station receiver may have a plurality of operating states with different power consumption levels. The receiver may repeatedly switch between the plurality of operating states, based on signal characteristics of the request signal.

BRIEF DESCRIPTION OF THE SEVERAL VIEWS OF THE DRAWINGS

Hereinafter, exemplary embodiments of the invention will be described with reference to the drawings.

FIGS. 9 and 10 respectively illustrate operation of a base station and a signal output of a client devices in an exemplary embodiment of the invention.

DETAILED DESCRIPTION OF THE INVENTION

Figure 1:
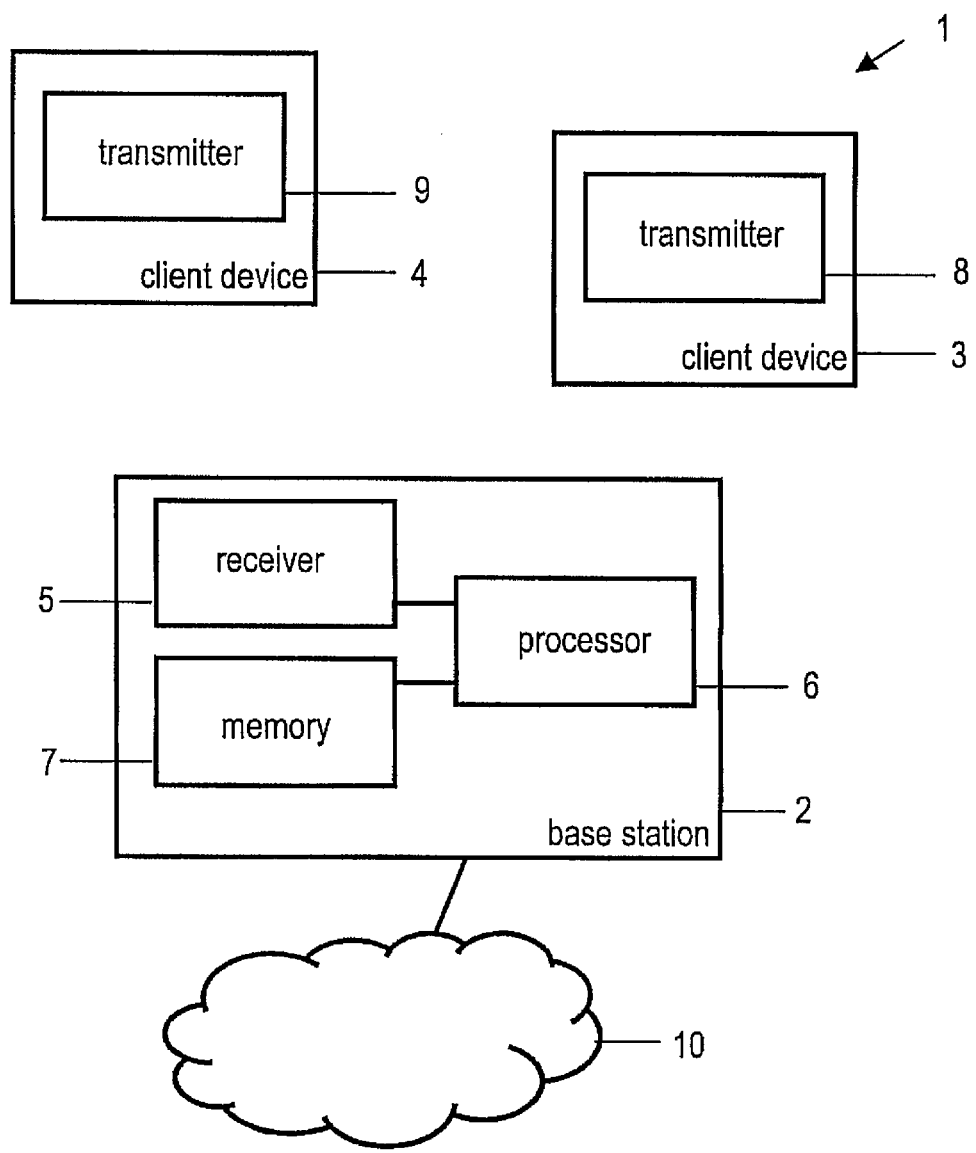
FIG. 1 is a schematic block diagram representation of a wireless communication system.

In the following, exemplary embodiments of the present invention will be described in detail. It is to be understood that the following description is given for the purpose of illustrating the principles of the invention and is not to be taken in a limiting sense. The scope of the invention is not intended to be limited by the exemplary embodiments described hereinafter.

In the exemplary embodiments shown in the drawings and described below, any direct connection or coupling between functional blocks, devices, components or other physical or functional units shown in the drawings or described herein can also be implemented by an indirect connection or coupling. Functional blocks may be implemented in hardware, firmware, software, or a combination thereof.

While some exemplary embodiments will be described in the context of wireless communication systems, such as a wireless local area network (WLAN) or cordless telephone systems, such as a Digital Enhanced Cordless Telecommunication (DECT) system, the various embodiments are not limited to these specific communication systems.

Further, it is to be understood that the features of the various exemplary embodiments described herein may be combined with each other, unless specifically noted otherwise.

The various embodiments of the invention generally relate to devices and methods that may be used in wireless communication, in which signals are transmitted via an air interface. A wireless communication system may have a base station. In the context of some embodiments, the term 'base station' refers to a device that can communicate with one or several client devices via an air interface. In the context of some embodiments, the term 'base station' refers to a device that allows several client devices to communicate with each other, or that allows a client device or several client devices to communicate with a network via the base station. In order to establish a connection with the base station, a client device may transmit a request to the base station to establish a connection. In the context of some embodiments, the term 'request to establish a connection' refers to a signal or group of signals transmitted to initiate a procedure in which a connection is established between a base station and a client device.

One implementation of a wireless communication system, in which embodiments of the present invention may be implemented, includes a wireless local area network (WLAN). A base station may be implemented as a WLAN access point and a client device may be configured as any one of a wide variety of electronic devices capable of connecting to a WLAN, including portable computers, personal digital assistants (PDAs), cell phones, or similar. A request to establish a connection may be implemented, for example, by an association request transmitted from a client device to the WLAN access point.

Another implementation of a wireless communication system, in which embodiments of the present invention may be implemented, includes a cordless telephone system, such as a DECT system. A base station may be implemented as a fixed terminal of the cordless telephone system and a client device may be implemented as a handset of the telephone system. A request to establish a connection may be implemented, for example, as a wake-up signal transmitted from a client device to the fixed terminal in order to wake up the fixed terminal from a low power mode.

In order to allow a connection to be established based on the request transmitted by the client device, the base station should be configured to receive the request and to respond to the request, even when no connection is presently established between the base station and a client device. One way to allow a base station to process the request transmitted by a client device is to permanently maintain receiver components of the base station in an operative state so as to allow the base station to receive the request. Permanently maintaining the operative state of the receiver components leads to a power consumption overhead.

According to exemplary embodiments of the invention, a base station comprises a receiver having a plurality of operating states with different power consumption levels. The base station may be configured such that the receiver periodically switches between different operating states when no client device is associated with the base station. The switching between the various operating states may depend on one or plural parameters. The parameters may be set based on signal characteristics of a request transmitted by a client device when the client device requests a connection to be established with the base station.

FIG. 1 is a schematic block diagram representation of a wireless communication system 1 in which various embodiments of the invention may be utilized. The communication system comprises a base station 2 and plural client devices 3, 4. While two client devices 3, 4 are shown in FIG. 1 for illustration, communication systems according to various embodiments may also comprise one client device or more than two client devices. The client device 3 comprises a transmitter 8 operable to transmit a request to the base station 2. The request may, for example, be an association request of a WLAN client device or a wake-up signal of a handset in a DECT telephone system. Similarly, the client device 4 comprises a transmitter 9 operable to transmit a request to the base station 2.

The base station 2 comprises a receiver 5 to receive the request transmitted by client device 3 or the request transmitted by client device 4, a processor 6 coupled to the receiver 5 to control the receiver 5, and a memory 7 coupled to the processor 6. The base station 2 may be operative to allow the client devices 3, 4 to communicate with a network 10 via the base station 2. The network 10 may, for example, be a wide area network (WAN) or a wired telephone network, such as a public switched telephone network (PSTN). The base station 2 may also be operative to allow the client devices 3, 4 to communicate with each other.

In an exemplary embodiment of the invention, the receiver 5 of the base station 2 has at least two operating states. In a first operating state, the receiver 5 may be configured to receive signals. In a second operating state, the receiver may have a power consumption that is lower than in the first state. The second operating state may correspond to a Sleep state or Standby state of the base station 2, in which the receiver 5 of the base station 2 has reduced power consumption but can wake up quickly. The first operating state may correspond to a Listen state of the base station 2, in which the base station 2 listens for a signal to arrive, or an Active Rx state, in which additional receiver circuitry may be powered as compared to the Listen state.

In an exemplary embodiment of the invention, the processor 6 of the base station 2 may be configured to control the receiver 5 so that the receiver 5 switches between the first and second operating states in a low power mode. The low power mode may be activated when there is no active connection with any one of the client devices. In the low power mode, the processor 6 may control the receiver 5 based on one parameter or several parameters. The one or several parameters may specify a timing for switching the receiver 5 between the first and second operating states. The one or several parameters may be determined based on signal characteristics of requests transmitted by client devices 3, 4, respectively, in order to request that a connection be established with the base station 2. The signal characteristics of the request transmitted by the client device may be stored in the memory 7. The processor 6 may access the memory 7 to retrieve the signal characteristics of the request from the memory 7, in order to control the receiver 5 based on the signal characteristics of the request.

Figure 2:
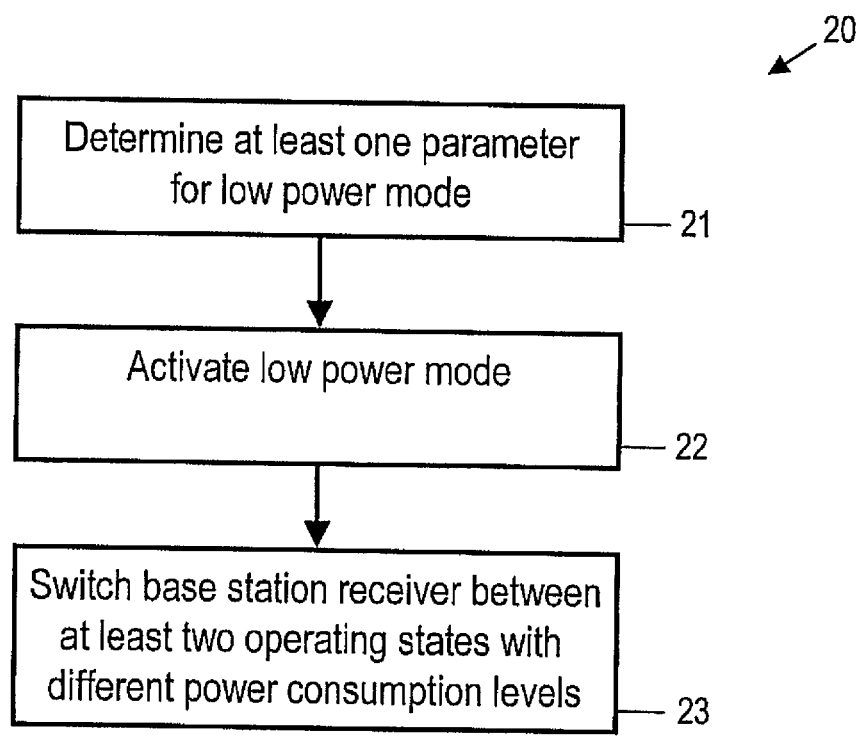
FIG. 2 is flow diagram representation of a method of operating a base station according to an exemplary embodiment of the invention.

FIG. 2 is a flow diagram representation of a method 20 of operating a base station according to an exemplary embodiment. The base station 2 of the communication system 1 of FIG. 1 may be controlled in accordance with the method 20 of FIG. 2.

At 21, at least one parameter for a low power mode of the base station is determined. The parameter or parameters for the low power mode may be determined based on signal characteristics of requests transmitted by one or several client devices when the client devices request that a connection be established with the base station. Determining the parameter or parameters for the low power mode may be performed when a client device that has not previously requested association with the base station requests association with the base station, or is otherwise registered with the base station.

At 22, the low power mode is activated. The low power mode may be activated when there is no active connection between the base station and a client device or when no client device is associated with the base station.

At 23, in the low power mode operation, a receiver of the base station switches between at least two different operating states having different power consumption levels. The receiver may be switched between the different operating states based on the at least one parameter determined at 21. In an exemplary embodiment, the receiver of the base station may be switched between a first operating state in which the receiver is configured to receive signals, and a second operating state in which the receiver has a power consumption lower than in the first state. In an exemplary embodiment, the receiver may be periodically switched between the first and second operating states. Switching the receiver between the first and second operating states may be based on various parameters, such as a first time period in which the receiver is in the first operating state, and a second time period in which the receiver is in the second operating state, respectively, in each periodic cycle. In another exemplary embodiment, switching the receiver between the first and second operating states may be based on parameters which include a duration of a first time period in which the receiver is in the first operating state in each periodic cycle, and a duration of a periodic switching cycle.

Figure 3:
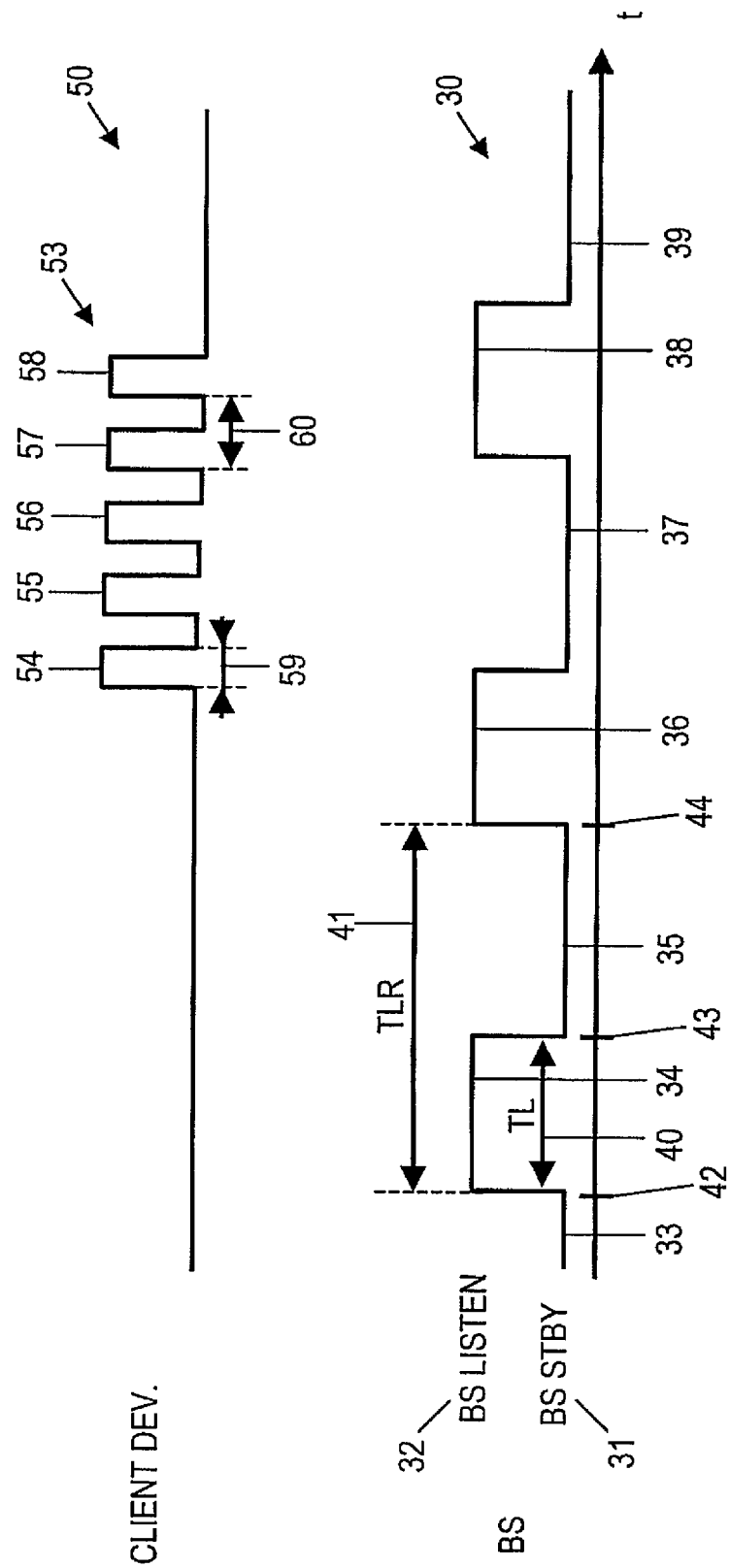
FIG. 3 illustrates an operation of a base station and a signal output of a client device in an exemplary embodiment of the invention.

FIG. 3 shows an exemplary base station operation as a function of time, which is generally indicated at 30, when the base station is in a low power mode. FIG. 3 also shows an exemplary signal output of a client device, which is generally indicated at 50. The illustrated exemplary operation of the base station may for example be implemented at 23 in the method 20 of FIG. 2. The illustrated exemplary operation of the base station may be performed by the base station 2 of the communication system 1 of FIG. 1, in which case the processor 6 may control the receiver 5 in accordance with the illustrated exemplary operation.

In the illustrated exemplary operation 30 of the base station, the receiver of the base station repeatedly switches between two operating states, namely a first operating state corresponding to a base station Standby state (BS STBY), indicated at 31, and a second state corresponding to a base station Listen state (BS LISTEN), indicated at 32. In the Listen state, the base station receiver is operative to receive and process a request transmitted by a client device to request association with the base station. In the illustrated exemplary operation 30 of the base station, the base station receiver is initially in the Standby state, as indicated at 33. At a time 42, the base station receiver switches to the Listen state, as indicated at 34, and maintains the Listen state for a time interval TL 40. At a time 43, the base station receiver switches back to the Standby state, as indicated at 35. At a time 44, the base station receiver starts a new periodic cycle in which it switches to the Listen state, as indicated at 36, and back to the Standby state, as indicated at 37. The cycle may be periodically repeated thereafter, as indicated at 38 and 39. A periodic cycle has a duration TLR 41. The duration TLR 41 of a periodic cycle is a parameter that determines operation of the base station in the low power mode. Similarly, the duration TL 40 of the listen interval is a parameter that determines operation of the base station in the low power mode.

FIG. 3 shows an exemplary signal output 50 of a client device as a function of time. In the illustrated exemplary signal output 50, a request 53 is transmitted by the client device to establish a connection with the base station. The request may be, for example, an association request in a WLAN system. The request 53 includes a plurality of request signals 54-58. While a sequence of five request signals 54-58 is illustrated in FIG. 3, another number of request signals may be transmitted by the client device in other embodiments. Each one of the request signals 54-58 has a duration TK indicated at 59, and successive request signals are transmitted with a constant time delay TR indicated at 60. Each one of the request signals 54-58 may include all data required for the client device to become associated with the base station.

In an exemplary embodiment, operation parameters of the base station in the low power mode may be set based on the duration 59 of the request signals 54-58 in the request 53. The operation parameters of the base station in the low power mode may also be set based on a repetition count of the request signals 54-58 in the request 53, i.e., the total number of request signals 54-58 successively transmitted when the client device requests association. The operation parameters of the base station in the low power mode may also be set based on the time delay 60 between successive request signals.

In an exemplary embodiment, the cycle duration TLR and the duration of the listen interval TL, based on which the base station receiver is controlled, may be adjusted based on the signal characteristics of the request. For illustration rather than limitation, the cycle duration TLR and the duration of the listen interval TL may be selected such that the base station receiver is configured to receive and process at least one of the request signals 54-58 transmitted by the client device when the client device transmits the request 53. When several client devices may request association with the base station, the cycle duration TLR and the duration of the listen interval TL may be selected based on signal characteristics of the requests transmitted by the various client devices.

As will be explained in more detail below, in an exemplary embodiment the base station may be configured to capture signal characteristics of a request transmitted by a client device, or the signal characteristics of requests transmitted by several client devices. The operation of the base station receiver in the low power mode may be controlled based on the captured request signal characteristics. In another exemplary embodiment, the base station may be configured to determine, upon an initial registration of the client device with the base station, whether the client device supports a set of operating parameters for the low power mode operation of the base station, and may set the operating parameters for the low power mode of the base station based on whether the client device supports the set of operating parameters.

Figure 4:
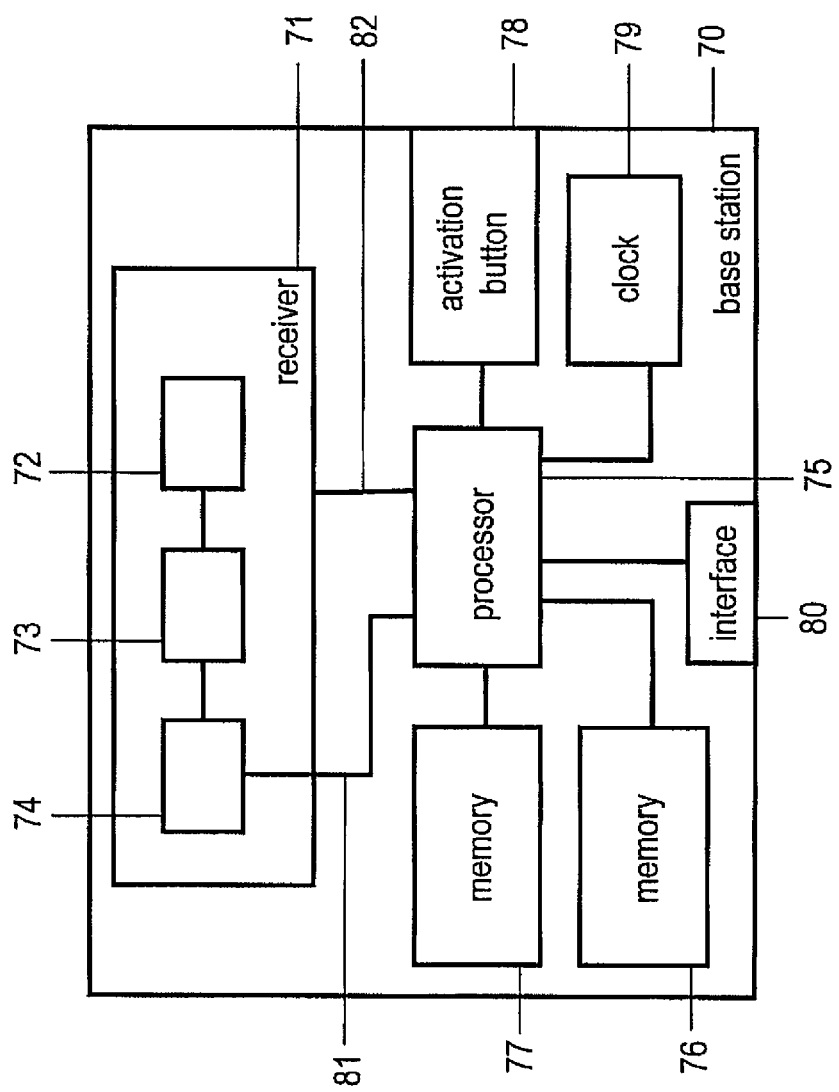
FIG. 4 is a schematic block diagram representation of a base station according to an exemplary embodiment of the invention.

FIG. 4 is a block diagram representation of a base station 70 for wireless communication according to an exemplary embodiment. The base station 70 may be used, for example, as base station 2 in the communication system 1 of FIG. 1. The base station 70 may be implemented as a WLAN access point.

The base station 70 comprises a receiver 71 which includes several receiver components 72-74 for processing received signals. The receiver components 72-74 may include one or several of an antenna, a duplexer, an analog signal amplifier, an A/D-converter, a digital signal amplifier, etc. The base station 70 further comprises a processor 75, a first memory 76, a second memory 77, an activation button 78, a clock device 79, and an interface 80. The processor 75 is coupled to a receiver component 74 to receive therefrom data 81 processed by the receiver 71. The processor 75 is coupled to the interface 80 to allow data processed by the processor 75 to be output via the interface 80, for example, to a network.

The processor 75 is coupled to the activation button 78 which is actuable by a user. When the activation button 78 is actuated, the base station 70 may enter a learning mode that will be described in more detail below. In the learning mode, the base station 70 may learn signal characteristics of an association request received by the receiver 71. When the learning mode is activated, the processor 75 may access the first memory 76 to retrieve therefrom instructions that are executed to determine signal characteristics of the association request received by the receiver 71.

The processor 75 may terminate the learning mode, for example, when the activation button 78 is actuated again or after a predetermined maximum learning time.

Based on the determined signal characteristics of the association request, the processor 75 may adjust one or several parameters for operating the base station in a low power mode. In the low power mode, the processor 75 controls the receiver 71 so that the receiver repeatedly switches between a first operating state and a second operating state. The first operating state may correspond to a Listen state of the base station, in which the receiver 71 is configured to receive at least a request transmitted by a client device in order to establish a connection. The second operating state may correspond to a Standby state of the base station, in which the receiver 71 consumes less power than in the first operating state. In an exemplary embodiment, the parameter(s) adjusted based on the determined signal characteristics may be indicative of a timing for switching the receiver 71 between the first and second operating states. The at least one parameter may comprise a duration of a periodic cycle of switching the receiver 71 between operating states. In an exemplary embodiment, the at least one parameter may comprise a duration of a time interval for which the receiver 71 is in the first operating state in each periodic cycle. The at least one parameter may also comprise a duration of a time interval for which the receiver 71 is in the second operating state in each periodic cycle.

The processor 75 may set the at least one parameter based on the signal characteristics of the association request, for example, when the learning mode is terminated. The set parameter(s) may be stored in the second memory 77. In another embodiment, the signal characteristics of the association request may be stored in the second memory 77.

In operation of the base station 70, the base station 70 may activate the low power mode when the learning mode is not activated and when no client device is associated with the base station 70. In the low power mode, the processor 75 may retrieve the determined parameter(s) from the second memory 77 and may control the receiver 71 such that the receiver switches between the different operating states. In an exemplary embodiment, some of the components 72-74 of the receiver 71 are supplied with a reduced power in the Standby state, or are not supplied with power at all. In an exemplary embodiment, the components of the receiver components 72-74 that are supplied with reduced power or are not supplied with power at all in the Standby state are components of the receiver 71 that can be quickly brought into an operative state when supplied with an increased power level again.

In the low power mode of the base station, the receiver 71 may receive an association request signal from a client device while it is in the first operating state, i.e., the Listen state. When the association request signal is received, the processor 75 may terminate the low power mode and may control the base station 70 so as to allow the client device to become associated with the base station 70.

Figure 5:
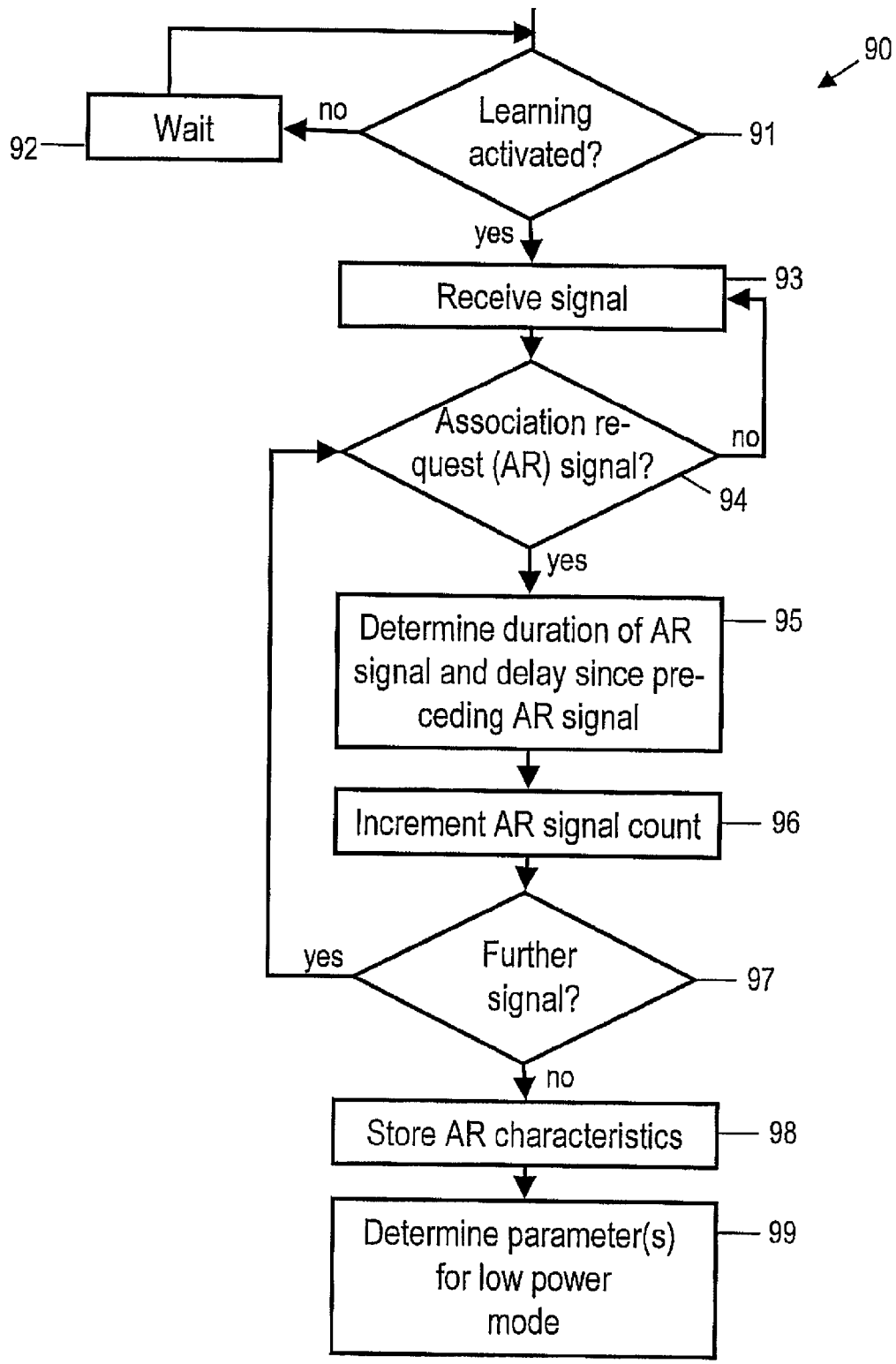
FIG. 5 is a flow diagram representation of a process of operating a base station in an exemplary embodiment of the invention.

FIG. 5 is a flow diagram representation of a process 90 of operating a base station. The process 90 of FIG. 5 may be performed by the base station 70 of FIG. 4. In an exemplary embodiment, the first memory 76 of the base station 70 may store instruction code which, when executed by the processor 75, directs the processor 75 to perform acts of the process 90. The process 90 may be used to implement the determining at 21 in the method 20 of FIG. 2.

At 91, the base station determines whether a learning mode is activated. The learning mode may be activated by a user action, for example, by the user actuating a button, switch, or other actuable component provided on the base station. If it is determined at 91 that the learning mode is not activated, the method may revert to the monitoring 91 after a wait period at 92.

If it is determined that the learning mode is activated, at 93 a signal is received by the base station. At 94, it is determined whether the received signal is an association request signal transmitted by a client device. Determining whether the received signal is an association request signal may comprise analog and digital signal processing. The determining at 93 may be performed by a suitable component in the signal processing path for the received signal. In an exemplary embodiment, the processor 75 of the base station 70 may determine whether the received signal is an association request signal.

If it is determined at 94 that the received signal is no association request signal, the method reverts to receiving a signal at 93.

If it is determined at 94 that the received signal is an association request signal, at 95 a duration of the association request signal is determined. Further, if another association request signal has previously been received, the time delay between the preceding and current association request signal may be determined at 95. The determining at 95 may be based on a clock signal provided to the processor 75, for example, by the clock device 79 of the base station 70. At 96, an association request signal count is increased.

At 97, it is determined whether a further signal is received at the base station. If it is determined that a further signal is received, the method returns to the determining whether the received signal is an association request signal at 94.

If it is determined that no further signal is received, at 98 signal characteristics of the association request are stored. The signal characteristics of the association request may be stored in a memory provided in the base station 70. The signal characteristics of the association request stored at 98 may include a duration of an association request signal. The signal characteristics of the association request stored at 98 may further include a time delay between successive association request signals. The signal characteristics of the association request stored at 98 may further include a total count of association request signals in the association request.

At 99, parameters for the low power mode of the base station are determined based on the determined signal characteristics of the association request. In an exemplary embodiment, the parameters may comprise a listen interval duration TL and a cycle period duration TLR. When TK denotes the duration of an association request signal, TR denotes the time delay between successive association request signals in the association request, and N denotes the total count of association request signals in the association request, the listen interval duration TL and the cycle period duration TLR may be adjusted such that $$TL \geqq TK+TR, \text{ and} \tag{1}$$

$$TLR \leqq N \times TR. \tag{2}$$

In an exemplary embodiment, the listen interval duration TL and the cycle period duration TLR may be adjusted such that $$TL=TK+TR, \text{ and} \tag{3}$$

$$TLR=N \times TR. \tag{4}$$

In an embodiment, the monitoring for further association request signals and the processing at 93-97 in the process 90 may be terminated when association request signals have been received from the client device for a time period that exceeds a predetermined time period TLRmax. This may be the case, for example, when the client device transmits a large number of, possibly infinitely many, association request signals in an association request, so that N×TR>TLRmax. The listen interval duration TL and the cycle period duration TLR may then be adjusted such that $$TL=TK+TR, \text{ and} \tag{5}$$

$$TLR=TLRmax. \tag{6}$$

The determined parameters for operation of the base station in the low power mode may be stored in the memory 77 of the base station 70. When the low power mode is activated in the base station 70, the parameters may be retrieved from the memory 77, and the processor 75 of the base station 70 may control the receiver based on the parameters such that the receiver switches between different operating states, as will be explained in more detail below.

Figure 6:
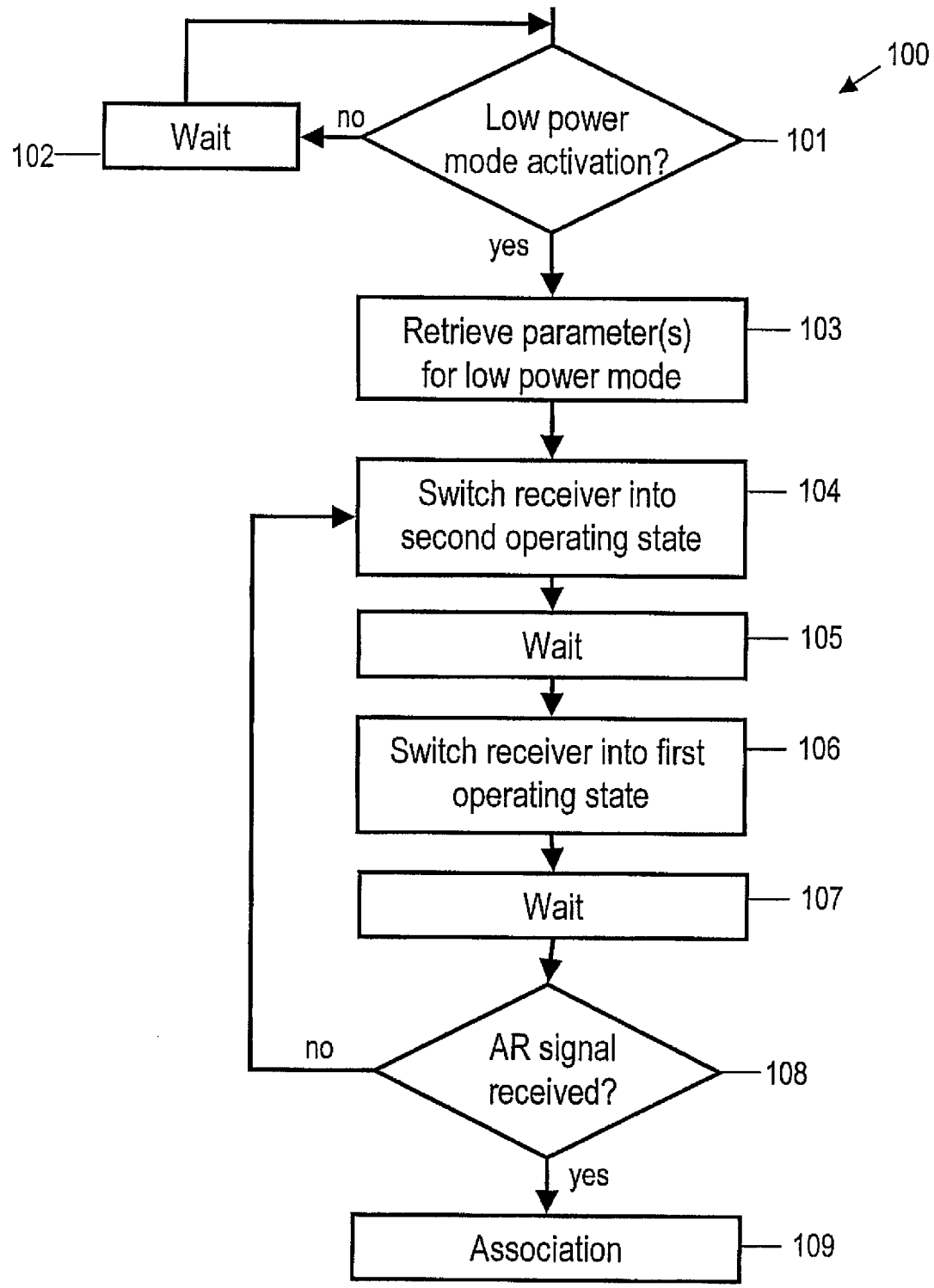
FIG. 6 is a flow diagram representation of a process of operating a base station in an exemplary embodiment of the invention.

FIG. 6 is a flow diagram representation of a process 100 of operating a base station. The process 100 of FIG. 6 may be performed by the base station 70 of FIG. 4. In an exemplary embodiment, the first memory 76 of the base station 70 may have stored therein instruction code which, when executed by the processor 75, directs the processor to perform acts of the process 100. The process 100 may implement the activation of the low power mode at 22 and the switching the base station receiver at 23 in the method 20 of FIG. 2.

At 101, the base station determines whether a low power mode is to be activated. The determining at 101 may include determining whether a client device is presently associated with the base station. In an exemplary embodiment, the low power mode may be activated when no client device has been associated with the base station for a predetermined time period. If it is determined at 101 that the low power mode is not to be activated, the method may revert to the monitoring at 101 after a wait period at 102.

If it is determined that the low power mode is to be activated, at 103 the stored parameters are retrieved from a memory of the base station. In an exemplary embodiment, the retrieved parameters may include a listen interval duration TL and a cycle period duration TLR. Based on the listen interval duration TL and the cycle period duration TLR, the receiver is controlled so that it repeatedly switches between a first operating state, which may correspond to the Listen state of the base station, and a second operating state, which may correspond to the Standby state of the base station.

At 104, the receiver 71 of the base station 70 is switched into the second operating state. Switching of the receiver 71 into the second operating state may be controlled by the processor 75 of the base station 70. At 105, the second operating state is maintained for a time period determined based on the parameters for the low power mode. In an exemplary embodiment, the second operating state is maintained for a time period equal to TLR-TL.

At 106, the receiver 71 of the base station 70 is switched into the first operating state. At 107, the first operating state is maintained for a time period determined based on the parameters for the low power mode. In an exemplary embodiment, the first operating state is maintained for a time period equal to TL.

At 108, it is determined whether the receiver has received an association request signal while the receiver has been in the first operating state. If an association request signal has been received, an association procedure is initiated at 109. In the association procedure, the base station 70 is controlled so as to allow the client device to be associated with the base station 70.

If it is determined at 108 that no association request signal has been received, the process 100 returns to 104. At 104, the receiver is switched back to the second operating state, and another switching cycle starts.

While the processes 90, 100 of operating a base station have been explained with reference to a sequence of acts, respectively, it is to be understood that some of the acts explained with reference to FIGS. 5 and 6 may be omitted, that additional acts may be implemented, and that some of the acts do not need to be performed in the indicated order. For illustration rather than limitation, in an exemplary embodiment, the determined signal characteristics of the association request are not stored in the memory of the base station. Rather, parameters for the low power mode of the base station are updated based on the determined signal characteristics of the association request, and the updated parameters are stored in the base station memory. In an exemplary embodiment, the parameters for the low power mode may be determined every time the low power mode is activated. In an exemplary embodiment, after activating the low power mode, the receiver may first be switched into the first operating state. In other embodiments, the receiver may be switched between more than two operating states when the low power mode of the base station is activated. In other embodiments, the receiver may have plural operating states, including the second operating state, which respectively have a power consumption level which is lower than the power consumption level associated with the first operating state of the receiver. Power consumption levels may vary between the plural operating states having reduced power consumption levels. In the plural operating states having reduced power consumption levels, the base station receiver may be operated so that active or operative receiver functions may vary from one of the plural operating states having a reduced power consumption to another one of the plural operating states having a reduced power consumption. For illustration rather than limitation, in one of the plural operating states, the base station receiver may be operative to perform a learning function, i.e., to determine characteristics of a signal transmitted from a client device, while in another one of the plural operating states having a reduced power consumption, the receiver may not be operative to process received signals.

The base station 70 may learn the signal characteristics of plural association requests transmitted by plural client devices. To this end, a user may repeatedly activate the learning mode of the base station and control one of the client devices to transmit an association request to the base station while the base station learning mode is activated. For illustration rather than limitation, when a user buys a new client device that has not previously requested association with the base station, the base station learning mode may be activated and the new client device may be controlled so as to transmit an association request to the base station.

The base station 70 may determine the signal characteristics of association requests transmitted by plural client devices, which may be stored in the memory 77 of the base station 70. In an exemplary embodiment, for each one of the association requests transmitted by one of the client devices, the determined signal characteristics may respectively include a duration $TK_i$ of an association request signal in the respective association request, a time delay $TR_i$ between successive association request signals in the respective association request, and a total count $N_i$ of association request signals in the respective association request, where the index i is a client device label.

Based on the signal characteristics of the plural association requests, parameters for the low power mode of the base station may be determined. In an exemplary embodiment, the parameters include the listen interval duration TL and the cycle period duration TLR, which may be set such that $$TL \geq \max_i(TK_i + TR_i), \text{ and} \quad (7)$$

$$TLR \leq \min_i(N_i \times TR_i), \quad (8)$$

where the maximum and minimum are respectively taken over the client device indices, $1 \leq i \leq M$, where M denotes the total number of client devices for which signal characteristics of the respective association request have been established.

In an exemplary embodiment, the listen interval duration TL and the cycle period duration TLR may be determined such that $$TL = \max_i(TK_i + TR_i), \text{ and} \quad (9)$$

$$TLR = \min_i(N_i \times TR_i). \quad (10)$$

When a client device transmits a larger number of association request signals in one association request, in an exemplary embodiment, the exact count of association request signals does not have to be determined for the respective client device. Rather, a lower limit may be established for the count of association request signals. For illustration, when the count of association request signals in an association request for a client device j is so large that the count exceeds TLRmax/$TR_j$, a lower limit for the repetition count is provided by $N_j$=TLRmax/$TR_j$, which may be used in Equations (8) and (10), respectively, to determine the parameter TLR.

Figure 7:
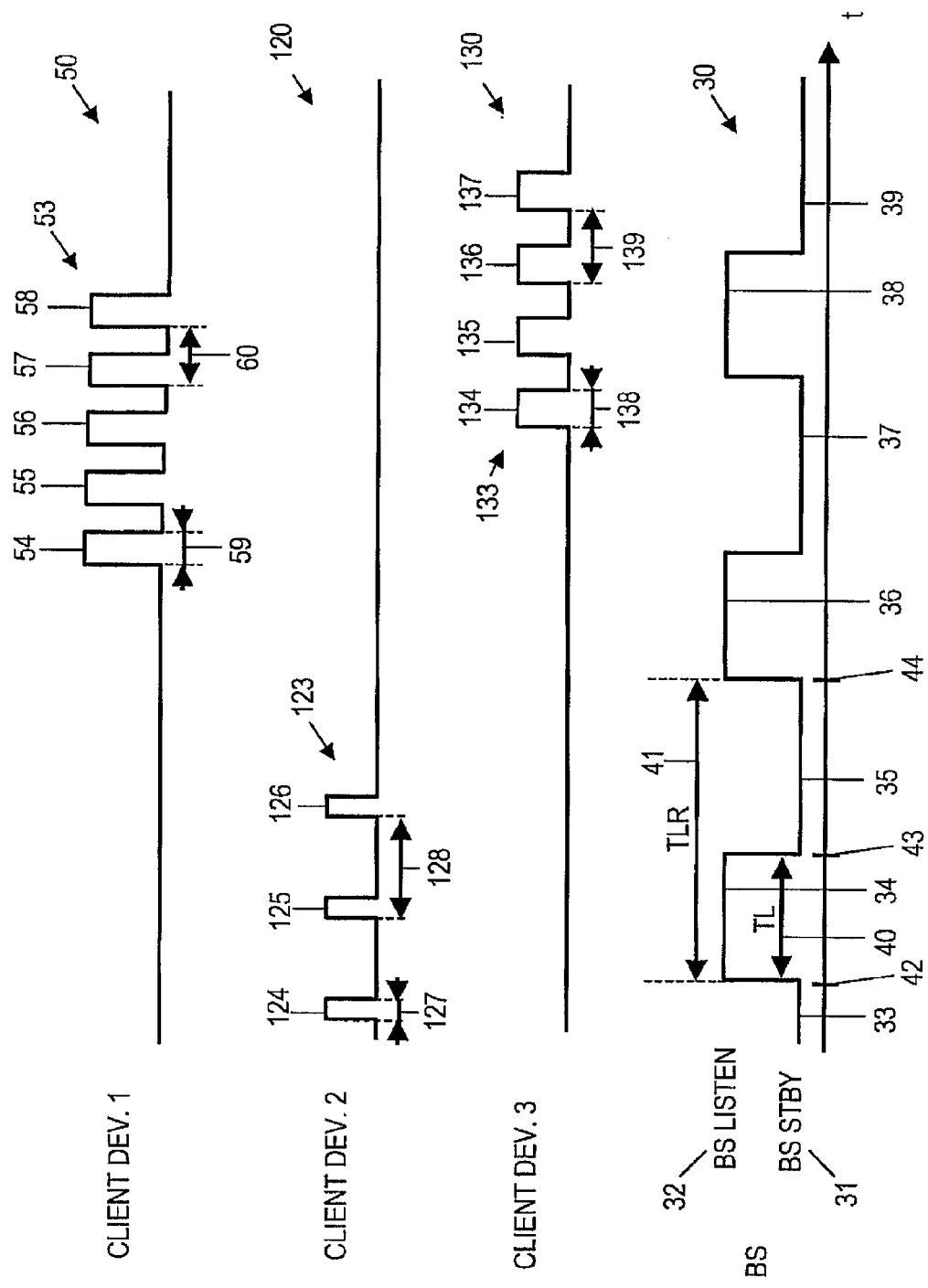
FIG. 7 illustrates operation of a base station and signal outputs of client devices in an exemplary embodiment of the invention.

FIG. 7 schematically illustrates an operation 30 of a base station. In FIG. 7, elements identical to elements explained with reference to FIG. 3 are provided with the same reference numerals as in FIG. 3, and a detailed discussion of these elements is omitted for brevity. FIG. 7 also illustrates signal outputs transmitted by three client device, indicated at 50, 120 and 130, respectively.

In the illustrated exemplary signal output, client device 1 transmits an association request 53, which includes five association request signals 54-58. Each one of the association request signals 54-58 has a duration $TK_1$ shown at 59. The time delay $TR_1$ between successive association request signals is indicated at 60. The total count of association request signals for client device 1 is $N_1$=5. Client device 2 transmits an association request 123, which includes three association request signals 124-126. Each one of the association request signals 124-126 has a duration $TK_2$ shown at 127. The time delay $TR_2$ between successive association request signals is indicated at 128. The total count of association request signals for client device 2 is $N_2$=3. Client device 3 transmits an association request 133, which includes four association request signals 134-137. Each one of the association request signals 134-137 has a duration $TK_3$ shown at 138. The time delay $TR_3$ between successive association request signals is indicated at 139. The total count of association request signals for client device 3 is $N_3$=4. It is to be understood that the various association requests 53, 123, 133 illustrated in FIG. 7 are provided for illustration rather than limitation.

For the low power mode operation of the base station shown in FIG. 7, the listen interval duration TL 40 and the cycle period duration TLR 41 are set so as to fulfil Equations (7) and (8). With these operation parameters, the base station receiver is in the Listen state and configured to receive one of the association request signals when any one of the client devices transmits the association request 53, 123, 133, respectively, at an arbitrary time. For illustration, when client device 1 transmits the association request 53, the base station receiver is in the Listen state and configured to receive the association request signal 58 when the association request 53 is transmitted. Similarly, when client device 2 transmits the association request 123, the base station receiver is in the Listen state and configured to receive the association request signal 125 when the association request 123 is transmitted. Similarly, when client device 3 transmits the association request 133, the base station receiver is in the Listen state and configured to receive the association request signal 135 when the association request 133 is transmitted.

According to some of the exemplary embodiments explained above, the base station receiver may be controlled so that it switches between different operating states. Parameters that determine the switching of the base station receiver may be set based on signal characteristics of association requests transmitted by client devices. The base station receiver may be controlled such that an association request signal transmitted by one of the client devices can be received, so as to allow the client device to become associated with the base station, even when operation of the base station and client device is initially not synchronised. Further, in some of the embodiments, power consumption of the base station receiver may be reduced by switching the base station receiver between operating states in the low power mode. Still further, in some embodiments, the base station receiver may be switched, in the low power mode, between a first operating state and plural operating states having power consumption levels that are respectively lower than the power consumption level associated with the first operating state.

Figure 8:
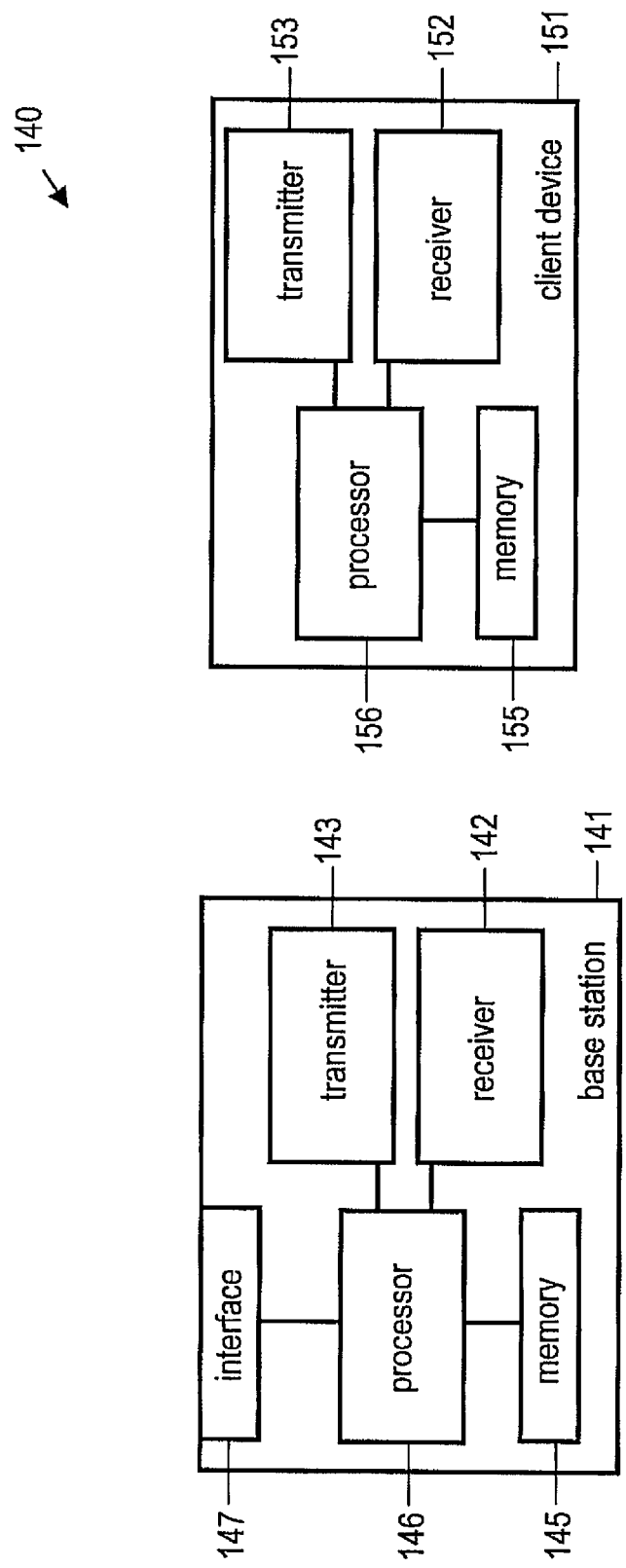
FIG. 8 is a schematic block diagram representation of a wireless communication system according to an exemplary embodiment of the invention.

FIG. 8 shows a wireless communication system 140 according to an exemplary embodiment of the invention. The communication system 140 comprises a base station 141 and a client device 151. In an exemplary embodiment, the wireless communication system 140 may be implemented as a DECT telephone system. The base station 141 may be implemented as the fixed terminal of the DECT telephone system, and the client device 151 may be implemented as a handset or mobile device of the DECT telephone system.

The base station 141 comprises a receiver 142, a transmitter 143, a processor 146, a memory 145, and an interface 147. The receiver 142 is configured to receive signals transmitted by the client device 151. The transmitter 143 is configured to transmit signals to the client device 151. The processor 146 is coupled to the receiver 142 and the transmitter 143 to control the receiver 142 and the transmitter 143. In an exemplary embodiment, the processor 146 may be configured to process signals received by the receiver 142 and/or to process signals to be transmitted by the transmitter 143. The interface 147 may be coupled, for example, to a PSTN to allow signals to be output from the base station 141 to the PSTN, or to receive signals from the PSTN at the base station 141. The memory 145 is configured to store a plurality of parameter sets, according to which the receiver 142 and/or the transmitter 143 may be controlled in a low power mode of the base station 141. The parameter sets may include one or several parameters that determine operation of the client device 151. As will be explained in more detail below, the processor 146 may select a set of parameters from the parameter sets stored in the memory 145 and may control the receiver 142 and/or the transmitter 143 in accordance with the selected set of parameters.

The client device 151 comprises a receiver 152, a transmitter 153, a processor 156, and a memory 155. The receiver 152 is configured to receive signals transmitted from the base station 141. The transmitter 153 is configured to transmit signals to the base station 141. The processor 156 is coupled to the receiver 152 and the transmitter 153 to control the receiver 152 and the transmitter 153, respectively. In an exemplary embodiment, the processor 156 may be configured to process signals received by the receiver 152 and/or to process signals to be transmitted by the transmitter 153. The memory 155 may be configured to store one or several parameters, according to which the receiver 152 and/or transmitter 153 of the client device may be controlled in a low power mode of the client device 151. The processor 156 may retrieve a parameter from the memory 155 and may control the receiver 152 and/or the transmitter 153 in accordance with the retrieved parameter. As will be explained in more detail below, the base station 141 may set the parameter based on which the receiver 152 and/or the transmitter 153 of the client device 151 is controlled in the low power mode.

In an exemplary embodiment, the base station 141 has a low power mode, that will also be referred to as sleep mode. The base station 141 may activate the sleep mode when the communication system 140 is in a zero emission mode. In the sleep mode, the base station receiver 142 is controlled by the processor 146 so as to periodically switch between a Scan state in which the receiver listens for a signal to arrive from a client device, and a Standby state which may have a power consumption lower than the Scan state. In order to request a connection to be established between the client device 151 and the base station 141, the client device 151 may transmit a wake-up signal to the base station. The wake-up signal transmitted from the client device to the base station has a wake-up signal duration or length that is determined by the duration of the wake-up signal transmit mode in the client device 151.

Operation of the base station 141 and the client device 151 may depend on one or several parameters. For illustration rather than limitation, the processor 156 of the client device 151 may control the transmitter 153 so as to transmit a wake-up signal having a given length or duration, the wake-up signal length being a parameter of the client device operation. Similarly, parameters that determine operation of the base station 141 in the sleep mode include the duration of a periodic cycle in which the base station receiver switches from the Standby state to the Scan state to listen for a signal from the client device 151. The parameters may also include a number of synchronisation hits that are required in the base station 141 to initiate wake-up from the sleep mode. In an embodiment, the number of synchronisation hits may be the number of consecutive Scan states in which the base station 141 receives the wake-up signal from the client device 151.

In an exemplary embodiment, the base station 141 may set the length of the wake-up signal that is to be transmitted from the client device 151 to the base station 151 in order to wake up the base station from the sleep mode. The base station 141 may set the wake-up signal length in such a manner that the memory 145 of the base station 141 has stored therein a plurality of values for the length of the wake-up signal, and the processor 146 may select the length of the wake-up signal from the stored values. The selecting may be based on the wake-up signal lengths that are supported by the client device 151. When several client devices are registered with the base station 141, the wake-up signal length may be selected from the values stored in the memory 145 so that each one of the client devices supports the selected wake-up signal length. When each one of the client devices registered with the base station 141 supports a first wake-up signal length and a second wake-up signal length, in an exemplary embodiment, the processor 141 may select the larger one of the wake-up signal lengths. In an exemplary embodiment, when each one of the client devices registered with the base station 141 supports a first wake-up signal length and a second wake-up signal length, the processor 141 may select the larger one of the wake-up signal lengths if the larger one of the wake-up signal lengths allows a connection to be established in an acceptable time, and may select a shorter wake-up signal length otherwise.

The base station 141 may notify client devices registered with the base station 141 of the selected wake-up signal length. When the base station 141 activates the base station sleep mode, the processor 146 may adjust the rate at which the receiver 142 is switched to the Scan state based on the selected wake-up signal length.

FIGS. 9 and 10 illustrate an exemplary operation of a base station in the sleep mode and exemplary wake-up signals transmitted by a client device.

FIG. 9 shows as a function of time a signal transmission 166 of a client device which transmits a wake-up signal 167. The wake-up signal has a length indicated at 168. Assuming, for illustration rather than limitation, that the base station is implemented as base station of a DECT telephone system and that the client device is a handset of the DECT telephone system, the length 168 of the wake-up signal 167 may be specified in terms of DECT frames. The illustrated exemplary wake-up signal has a length of N_PT=4 DECT frames.

Operation of the base station is shown at 160. The base station receiver is periodically switched between two different states, namely the Standby state indicated at 161 and the Scan state indicated at 162. When the base station is implemented as base station of a DECT telephone system, the timing of the switching of the base station may be specified in terms of DECT frames. A plurality of DECT frames 163 is schematically indicated by broken lines, each one of the DECT frames having a duration of, e.g., 10 ms indicated at 164. In operation of the base station, as shown at 160, the processor 145 controls the base station receiver 142 so that the receiver 142 periodically switches to the Scan state in every second DECT frame. The length of a periodic cycle is shown at 165. This periodic cycle length allows that N_FT_HIT=2 synchronisation hits are received if the client device outputs a wake-up signal having a length of N_PT=4 DECT frames.

FIG. 10 shows as a function of time a signal transmission 176 of a client device which transmits a wake-up signal 177. The illustrated wake-up signal has a length N_PT=16 DECT frames. Correspondingly, the base station 141 may adjust the rate at which the base station receiver switches to the Scan state based on the wake-up signal length. Operation of the base station is shown at 160. The base station receiver is periodically switched between the Standby state 161 and the Scan state 162, the length of a periodic cycle being N_PT/N_FT_HIT=16/2=8 DECT frames, as indicated at 175.

In an exemplary embodiment of the invention, the base station may set the length of the wake-up signal. When all client devices support a wake-up signal length that is longer than a default length, the base station may select the longer wake-up signal length, provided that the longer wake-up signal length still allows a connection to be established within an acceptable time. The rate at which the base station is brought to the Scan state when in the sleep mode can be decreased in correspondence with the selected wake-up signal length. In an exemplary embodiment, this may lead to reduced power consumption of the base station. For illustration rather than limitation, when all client devices registered with the base station support a wake-up signal length of N_PT=256 DECT frames, the base station may set N_PT=256. For N_FT_HIT=2, the base station receiver 142 may be controlled so that it switches to the Scan state in every 128th DECT frame.

In order to determine which wake-up signal lengths are supported by client devices registered with the base station, the base station 141 may determine the supported wake-up signal lengths by identifying a client device type or client device manufacturer. For example, when client devices produced by a given manufacturer are known to support several wake-up signal lengths, that may be stored in the memory 145 of the base station 141, wake-up signal lengths supported by a client device may be established by identifying whether the client device has been produced by the given manufacturer.

Referring again to FIG. 8, when the communication system 140 is a DECT wireless telephone system, the base station 141 may determine wake-up signal lengths supported by a client device when the respective client device is registered with the base station 141. Based on the thus established information on supported wake-up signal lengths, the processor 146 of the base station 141 may select one of the several values for the parameter N_PT, i.e., the length of the wake-up signal, stored in the memory 145 and may notify client devices registered with the base station of the selected length of the wake-up signal. In order to notify the client devices of the selected length of the wake-up signal, in an exemplary embodiment, the processor 146 may control the transmitter 143 of the base station 141 to transmit a signal indicative of the selected wake-up signal length value to all registered client devices. In an exemplary embodiment, a default value for the wake-up signal length may be set in each one of the client devices, and the processor 146 may control the transmitter 143 of the base station 141 to transmit a signal to all registered client devices when a wake-up signal length other than the default value is selected.

Figure 11:
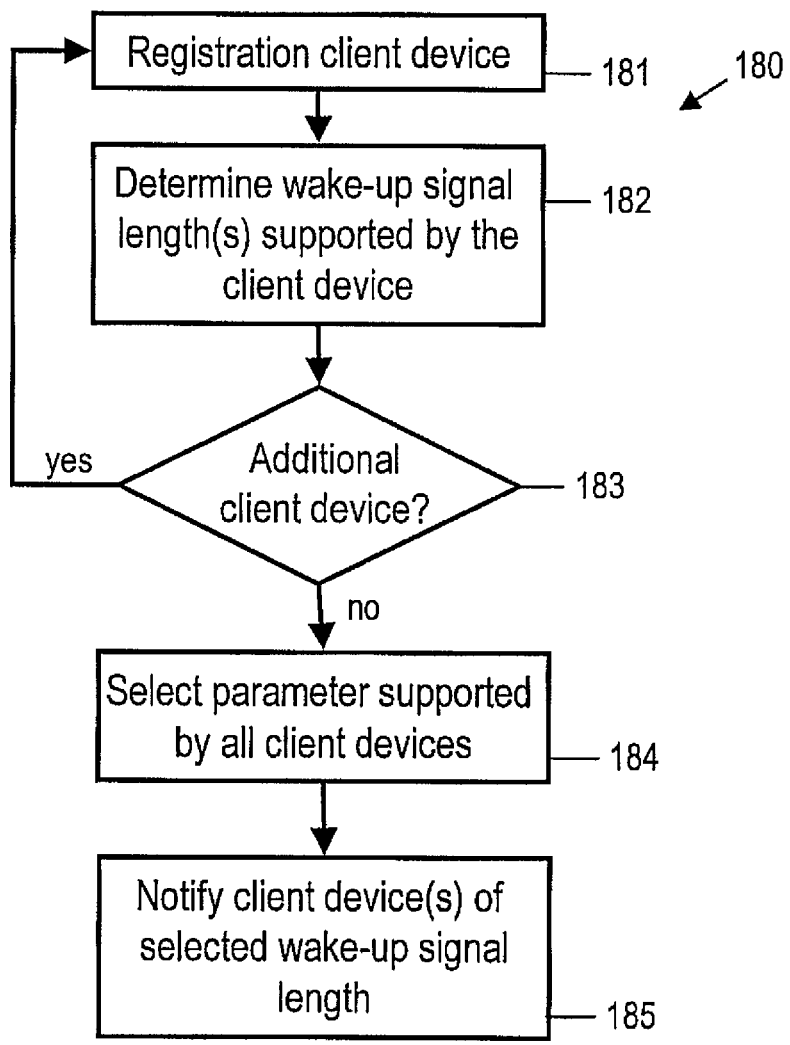
FIG. 11 is a flow diagram representation of a method that may be performed by a communication system according to an exemplary embodiment of the invention.

FIG. 11 is a flow diagram representation of a method 180 that may be performed to select a wake-up signal length in a communication system according to an embodiment. The method 180 may be performed by the base station 141 of the communication system 140 of FIG. 8.

At 181, a client device is registered with the base station. At 182, the wake-up signal lengths supported by the client device are determined by the base station upon registration of the client device. At 183, it is determined whether another client device is to be registered with the base station. If another client device is to be registered with the base station, the method returns to the registration at 181.

If no additional client device is to be registered, at 184, the base station selects a wake-up signal length. The wake-up signal length may be selected based on the wake-up signal lengths that are respectively supported by the client devices registered with the base station. In an embodiment, the wake-up signal length may be selected such that it is supported by all client devices registered with the base station.

At 185, the client devices registered with the base station may be notified of the selected wake-up signal length. When the client devices are notified of the selected wake-up signal length, the selected value may respectively be stored in the memory 155 of the client device 151. When a wake-up signal is to be transmitted from the client device 151 to the base station 141, the processor 156 of the client device 151 may retrieve the stored information on the selected wake-up signal length from the memory 155 and may control the client device 151 such that the wake-up transmit mode is activated for a duration that corresponds to the wake-up signal length and a wake-up signal having the selected length is transmitted to the base station 141.

In an exemplary embodiment, the base station may adjust plural parameters, based on which the operation of the base station in the sleep mode is controlled. In an embodiment, the processor 146 of the base station 141 may set the length N_PT of the wake-up signal to be transmitted by client devices in order to wake up the base station 141 from the sleep mode, and the number of synchronisation hits N_FT_HIT that are required for the base station to wake up from the sleep mode. The client devices may be notified of the values selected for N_PT and N_FT_HIT.

In an exemplary embodiment, one or several client devices 151 registered with the base station 141 may have a low power mode, also referred to as sleep mode. The sleep mode of the client devices 151 may be activated when the communication system goes into the zero emission mode. In the sleep mode, a client device may periodically switch from a Standby state in which no signal can be received to a Scan state in which the client device listens for a signal from the base station. The base station may transmit a wake-up signal having a length of N_FT frames to the client device in order to request the client device to wake up from the sleep mode. When a number of N_PT_HIT synchronisation hits is obtained at the client device, the client device 151 may wake up from the sleep mode. In an exemplary embodiment, the base station 141 may set values for N_FT and/or N_PT_HIT and may notify the client device(s) 151 registered with the base station 141 of the selected parameter values. The base station may select the values for N_FT and/or N_PT_HIT based on operating parameters that are supported by the client device(s) registered with the base station. The client device(s) may be configured to operate in accordance with the values for the parameters N_FT and/or N_PT_HIT selected by the base station when the sleep mode is activated in the client device(s).

According to exemplary embodiments, as has been explained above, a base station of a wireless communication system, such as a DECT telephone system, may set operating parameters for a sleep mode of the base station and/or client device. When the base station sleep mode is activated, a base station receiver may periodically be switched between a Standby state and a Scan state in accordance with the parameters set at the base station.

While methods and devices according to several embodiments have been described with reference to the drawings, it is to be understood that the different embodiments are described to allow the skilled person to more readily understand the various features and advantages of the embodiments, and to carry out the invention in its presently preferred form. The embodiments are not intended to limit the scope of the invention.

Various modifications of the embodiments can be implemented in other embodiments. For illustration rather than limitation, while devices comprising a receiver and a processor coupled to the receiver have been described, it is to be understood that the processor and receiver may also be implemented as an integral unit in the various embodiments. While in the context of some embodiments devices having separate memories for storing instruction code and for storing parameters for operation of the device have been described, the memories may also be integrally formed, i.e., the device may comprise one memory storing both instruction code and parameters determining operation of the device in the low power mode. While in the context of some embodiments devices have been described in which a processor may be operative to both control a receiver and to process signals received by the receiver, in other embodiments, a device may comprise a first processor to process signals received by the receiver and a second processor to control operation of the receiver.

While some devices, systems and methods have been described in the context of a WLAN or DECT system, according to other embodiments, the devices, systems and methods may be used in other wireless communication systems.

As can be seen, numerous modifications and alterations to the embodiments described herein may be implemented in other embodiments. Therefore, the present invention is not to be limited by the described embodiments, but is intended to be limited only by the appended claims and equivalents thereof.

What is claimed is:

1. A base station for wireless communication, comprising:
a receiver having a first operating state and a second operating state, wherein said receiver in said first operating state is configured to receive signals, and wherein said receiver in said second operating state has a power consumption lower than in said first operating state; and
a processor coupled to said receiver and configured to control said receiver based on at least one parameter so that said receiver periodically switches from said first operating state to said second operating state and back to said first operating state while no signal is received by said receiver, said processor being configured to adjust said at least one parameter to variably adjust a timing of said switching from said second operating state to said first operating state of said receiver.

2. The base station according to claim 1, wherein said processor is configured to control said receiver to switch to said first operating state for a time interval determined based on said at least one parameter.

3. The base station according to claim 1, wherein said processor is configured to adjust said at least one parameter based on signal characteristics of a request transmitted by a client device to establish a connection with said base station.

4. The base station according to claim 3, wherein said at least one parameter comprises a duration of said request transmitted by said client device.

5. The base station according to claim 4, wherein said at least one parameter further comprises a repetition count of said request transmitted by said client device.

6. The base station according to claim 1, wherein said base station is configured for communication in a wide area network or a wired telephone network.

7. The base station according to claim 1, wherein said processor is configured to periodically switch said receiver from said first operating state to said second operating state and back to said first operating state while no client device is associated with the base station.

8. A wireless communication system, comprising
a communication device comprising a receiver; and
a client device configured to transmit a request to said communication device to establish a connection with said communication device;
wherein said receiver of said communication device has a first operating state and a second operating state, wherein said receiver in said first operating state is configured to receive said request from said client device, and wherein said receiver in said second operating state has a power consumption lower than in said first operating state,
wherein said receiver is configured to periodically switch from said first operating state to said second operating state and back to said first operating state while no signal is received by said receiver based on signal characteristics of said request transmitted by said client device, and to variably adjust a timing of said switching from said second operating state to said first operating state.

9. The wireless communication system according to claim 8,
wherein said communication device is a base station configured to detect said signal characteristics of said request.

10. The wireless communication system according to claim 8,
wherein said communication device is a base station configured to identify said client device and to establish said signal characteristics of said request based on said identified client device.

11. The wireless communication system according to claim 8, wherein said receiver is configured to periodically switch from said first operating state to said second operating state and back to said first operating state while no client device is associated with the base station.

12. A base station for wireless communication, comprising:
a receiver; and
a processor coupled to said receiver and configured to process signals received by said receiver;
wherein said base station has a learning mode,
wherein, when said learning mode is activated, said receiver is configured to receive an association request and said processor is configured to determine signal characteristics of said association request,
wherein said processor is configured to control said receiver based on said determined signal characteristics in a low power mode so that said receiver periodically switches from a higher power consumption operating state to a lower power consumption operating state and back to said higher power consumption operating state while no signal is received by said receiver, said processor being configured to variably adjust a timing of said switching from said lower power consumption operating state to said higher power consumption operating state in said low power mode.

13. The base station according to claim 12, wherein said association request comprises a plurality of association request signals, and said determined signal characteristics comprise at least one of a duration of an association request signal, a time delay between successive association request signals and a repetition count of said plurality of association request signals.

14. The base station according to claim 12, wherein said processor is configured to control said receiver based on said determined signal characteristics so that said receiver periodically switches from said higher power consumption operating state to said lower power consumption operating state and back to said higher power consumption operating state.

15. The base station according to claim 12, wherein said processor is configured to respectively determine said signal characteristics for a plurality of client devices and to control said receiver based on said signal characteristics determined for said plurality of client devices.

16. The base station according to claim 15, comprising
a memory;
wherein said processor is coupled to said memory to store said signal characteristics determined for said plurality of client devices in said memory.

17. The base station according to claim 12, wherein said base station is a WLAN access point.

18. A method of operating a base station for wireless communication, comprising:
providing a base station;
receiving an association request from a client device at said base station;
determining signal characteristics of said received association request; and
controlling said base station based on said determined signal characteristics so that said base station periodically switches between a plurality of operating states with different power consumption levels in a low power mode and so that a timing of said switching between said plurality of operating states in said low power mode is variably adjusted.

19. The method of claim 18, wherein said association request transmitted by said client device comprises a plurality of association request signals, and said determined signal characteristics comprise at least one of a duration of an association request signal, a time delay between successive association request signals and a repetition count of said plurality of association request signals.

20. The method of claim 19, wherein said base station is controlled such that said base station is configured to receive at least one association request signal of said plurality of association request signals in said low power mode.

21. The method of claim 18, wherein said receiving and said determining are performed for a plurality of client devices.

22. The method of claim 21, wherein said base station is controlled such that, when any one client device of said plurality of client devices transmits an association request comprising a plurality of association request signals, said base station is configured to receive at least one association request signal of said association request in said low power mode.

23. The method of claim 18, wherein said base station periodically switches between said plurality of operating states while no client device is associated with the base station.

24. A wireless communication system, comprising:
- a communication device having a low power mode; and
- a client device configured to transmit a wake-up signal to said communication device to initiate a wake-up of said communication device from said low power mode, wherein said client device is configured to generate said wake-up signal based on a parameter;
- wherein said communication device is configured to set said parameter and to notify said client device of said set parameter, and to switch between different operation states in said low power mode at variably adjusted intervals.

25. The wireless communication system according to claim 24, wherein said communication device is a base station configured to periodically listen in said low power mode for said wake-up signal with a periodicity, wherein said periodicity is adjusted based on said set parameter.

26. The wireless communication system according to claim 25,
- wherein said client device has a low power mode in which said client device periodically listens for a signal from said base station with a further periodicity,
- wherein said base station is configured to set said further periodicity and to notify said client device of said set further periodicity.

27. The wireless communication system according to claim 24, further comprising:
- at least one additional client device,
- wherein said communication device is configured to set said parameter such that said client device and said at least one additional client device respectively are configured to transmit a wake-up signal generated based on said set parameter.

28. The wireless communication system according to claim 24, wherein said wireless communication system is a DECT telephone system.

* * * * *